(12) United States Patent
Grimm et al.

(10) Patent No.: US 7,114,767 B2
(45) Date of Patent: Oct. 3, 2006

(54) WINDOW BLIND FOR A SLIDING ROOF SYSTEM

(75) Inventors: Rainer Grimm, Frankfurt am Main (DE); Horst Boehm, Frankfurt am Main (DE); Thomas Becher, Rodgau (DE); Christian Biewer, Altheim (DE)

(73) Assignee: ArvinMeritor GmbH, (DE)

( * ) Notice: Subject to any disclaimer, the term of this patent is extended or adjusted under 35 U.S.C. 154(b) by 51 days.

(21) Appl. No.: 10/973,081

(22) Filed: Oct. 25, 2004

(65) Prior Publication Data

US 2005/0225123 A1  Oct. 13, 2005

(30) Foreign Application Priority Data

Apr. 8, 2004  (DE) ............. 10 2004 017 459

(51) Int. Cl.
*B60J 1/20*  (2006.01)

(52) U.S. Cl. ................. 296/214; 296/141

(58) Field of Classification Search ........... 296/214, 296/141
See application file for complete search history.

(56) References Cited

U.S. PATENT DOCUMENTS

| | | | | |
|---|---|---|---|---|
| 4,707,018 | A * | 11/1987 | Gavagan | 296/152 |
| 4,825,921 | A * | 5/1989 | Rigter | 160/23.1 |
| 6,047,762 | A * | 4/2000 | Anderson | 160/370.22 |
| 6,309,076 | B1 * | 10/2001 | McVicker | 359/601 |
| 2004/0075304 | A1 * | 4/2004 | Cocaign | 296/214 |

* cited by examiner

*Primary Examiner*—Dennis H. Pedder
(74) *Attorney, Agent, or Firm*—Carlson, Gaskey & Olds

(57) ABSTRACT

A window blind for a sliding roof system having a flexible material and two guide elements extending along the longitudinal edges of the flexible material. The guide elements engage in a guide associated with a corresponding longitudinal edge. The guide element is a flat strip that is fastened to a longitudinal edge of the flexible material so that it can be wound up together with the window blind.

20 Claims, 3 Drawing Sheets

WINDOW BLIND FOR A SLIDING ROOF SYSTEM

REFERENCE TO RELATED APPLICATION

The present invention claims the benefit of German Patent Application No. 102004017459.8, filed Apr. 8, 2004.

TECHNICAL FIELD

The invention relates to a window blind for a sliding roof system, and more particularly to a window blind having a flexible material and two guide elements extending along the longitudinal edges of the window blind to engage in a corresponding guide.

BACKGROUND OF THE INVENTION

Window blinds are commonly used in sliding roof systems to expose and hide an opening in a vehicle roof. The window blind is usually made of a flexible material that may be attached underneath the vehicle roof opening in order to cover the opening to a greater or lesser extent, depending on the choice of the vehicle occupants. If the opening is to be exposed, the window blind is wound on a winding shaft. If the opening is to be hidden, the window blind can be uncoiled so that it covers the opening. The longitudinal edges of the window blind are received in a guide so that the window blind can be held taut transverse to the shifting direction. This prevents the window blind from sagging into the vehicle interior space when lying underneath the opening in the vehicle roof.

The longitudinal edges of the window blind are usually angled and inserted in guide grooves of a guide rail. This allows application of a desired tension in the transverse direction. One disadvantage of this configuration, however, is that the window blind occupies a large overall height due to the angled longitudinal edges of the guide rail. This reduces the amount of available headroom in the vehicle interior space. Moreover, the transition area from the winding shaft to the entrance in the guide grooves needs to be covered by a facing, causing the facing to be wider than desirable.

There is a desire for a window blind that can be received in a guide and that can be held taut in a transverse direction while keeping manufacturing costs low. There is also a desire for a window blind that occupies a small amount of space.

SUMMARY OF THE INVENTION

The invention is directed to a window blind having a guide element in the form of a flat strip fastened to a corresponding longitudinal edge of the window blind so that both the flat strip and the window blind can be wound up together. The flat strip eliminates the need to provide a lateral bend in the longitudinal edge for inserting into a guide and holding the window blind taut. Instead, the guide elements are applied to the longitudinal edges of the window blind and run straight into a guide associated with the corresponding longitudinal edges without the need to configure the guide elements to include an angle. The guide elements are received in the guide so that a desired pretension can be obtained in the transverse direction.

In one embodiment, the guide element in the initial state has a first cross-sectional shape for insertion in the guide and can be transferred to a second cross-sectional shape that allows the window blind to wind up in a space-saving manner. Altering the cross-sectional shape of the guide element allows the guide element to be suitably received in the associated guide while still being able to be wound up flat on a winding shaft together with the window blind. Advantageous embodiments of the invention will be apparent from the sub-claims.

BRIEF DESCRIPTION OF THE DRAWINGS

The invention will now be explained with the aid of a preferred embodiment illustrated in the attached drawings in which.

DETAILED DESCRIPTION OF THE PREFERRED EMBODIMENT

Generally, the invention is directed to a window blind having a guide element in the form of a flat strip that is fastened to a corresponding longitudinal edge of the window blind so that the flat strip and the window blind can be wound up together. The invention is based on the fact that the window blind no longer incorporates a lateral bend for inserting the window blind into a guide so that the window blind can be held taut. Instead, applying guide elements in the form of flat strips on the longitudinal edges of the window blind allows the guide elements to run straight into a guide associated with the corresponding longitudinal edges without configuring the guide elements to be angled. The guide elements are received in the guide so that a desired pretension can be obtained in the transverse direction.

According to one embodiment of the invention, the guide element in the initial state has a first cross-sectional shape that allows the guide element to be received in the guide. The guide element can also be transferred to a second cross-sectional shape that allows the guide element and the attached window blind to wind up in a space-saving manner. This embodiment alters the shape of the guide element to allow the guide element to be suitably received in its associated guide while still allowing the guide element to be wound up flat on a winding shaft together with the window blind.

A curved cross-sectional shape in the guide element is particularly suitable for the above functions. When the guide element is curved, it has a comparably large height, which securely anchors the guide element in the interior of its corresponding guide. If the guide element instead is pressed flat, it has a comparably small height corresponding essentially to the thickness of the flexible material used to form the window blind. This allows the guide element, together with the window blind, to be wound up in a space-saving manner.

According to another embodiment of the invention, the guide element is configured as a flat strip having a rectangular cross-sectional shape. This guide element can also be used to securely anchor in the guide, particularly if it is connected with the window blind only in sections.

Figure 1:
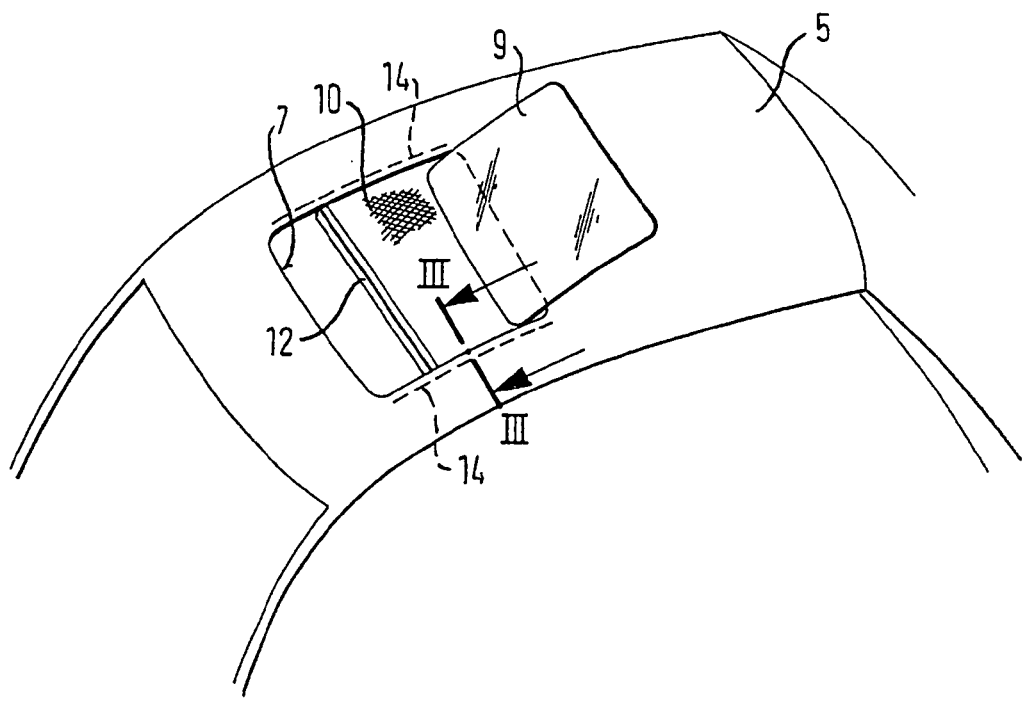
FIG. 1 is a perspective view of a vehicle roof comprising a window blind according to the invention.
Figure 2:
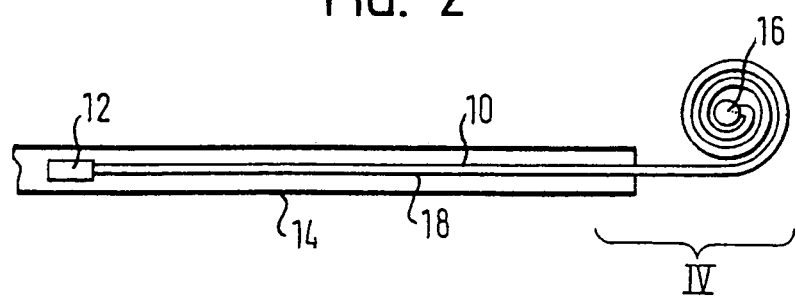
FIG. 2 is a schematic side view of a window blind according to the invention.

Referring to the Figures, FIG. 1 illustrates a vehicle roof 5 having an opening 7. A cover 9 of a sliding roof system is associated with the opening 7 to open and close the opening 7. The cover 9 can be shifted between a closed position where it closes the opening 7 and an open position shown in FIG. 1. A window blind 10 is arranged underneath the cover 9 and also underneath the opening 7. The window blind 10 can be moved forward and backward toward the front and the rear, respectively of the vehicle. If the window blind 10 is pushed completely toward the rear of the vehicle, the opening 7 will be entirely exposed. Fresh air and sunlight can then enter the vehicle interior space freely. If the window blind 10 is pushed completely toward the front of the vehicle, the opening 7 is covered by the window blind, limiting the entry of fresh air and sunlight into the vehicle interior space.

The window blind 10 can be made from any flexible material, such as cloth or plastic film. A handle 12 is disposed on the front edge of the window blind 10, which can be gripped by a vehicle occupant in order to displace the window blind 10 toward the front or the rear of the vehicle. Two guides 14 extend laterally along the opening 7 and receive the two longitudinal edges of the window blind 10 (i.e., the right and left edges of the window blind 10 as viewed in the longitudinal direction of the vehicle). At the rear end of the opening 7, a winding shaft 16 is attached to the rear edge of the window blind 10. The winding shaft 16 may be biased by a spring so that the window blind 10 will be automatically received on the winding shaft 16 when the handle 12 is pushed toward the rear.

Each window blind 10 has a guide element 18 disposed along each of its longitudinal edges. That is, in the area associated with the guides 14, the guide element 18 is configured in the embodiment of FIG. 3 as a thin strip made of resilient steel or plastic. In the initial state (i.e., when no external forces act on the guide element 18), the guide element 18 has the curved cross-sectional shape shown in FIG. 3. The window blind 10 is connected with the guide element 18 only on an outer portion of the guide element 18, namely from the outer edge of the guide element 18 to approximately the vertex of the guide element 18. This area is denoted by reference numeral 20 in FIG. 3. In particular, the window blind 10 can be glued to the guide element 18 in this outer portion.

Figure 3:
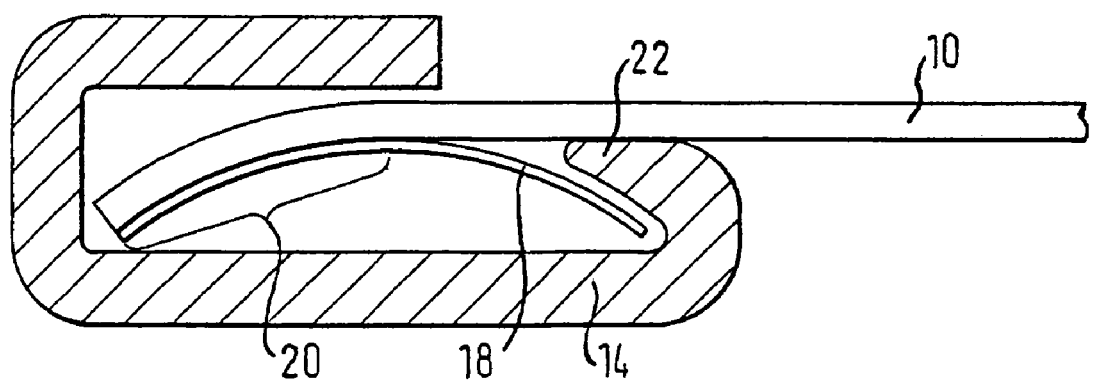
FIG. 3 shows schematically a section along plane III—III of FIG. 1.

As shown in the section view of FIG. 3, the guide 14 has a generally rectangular cross-section and has an interior space that accommodates the guide element 18 together with the edge portion of the window blind 10 attached to it. On a side of the guide 14 oriented toward the center of the vehicle, the guide 14 has a leg 22 extending between the window blind 10 and the portion of the guide element 18 oriented toward the center of the vehicle (i.e., in an area in which the window blind 10 is not attached to the guide element 18). Thus, the guide element 18 can find a support underneath the leg 22 to hold the window blind 10 taut in the transverse direction.

Figure 4:
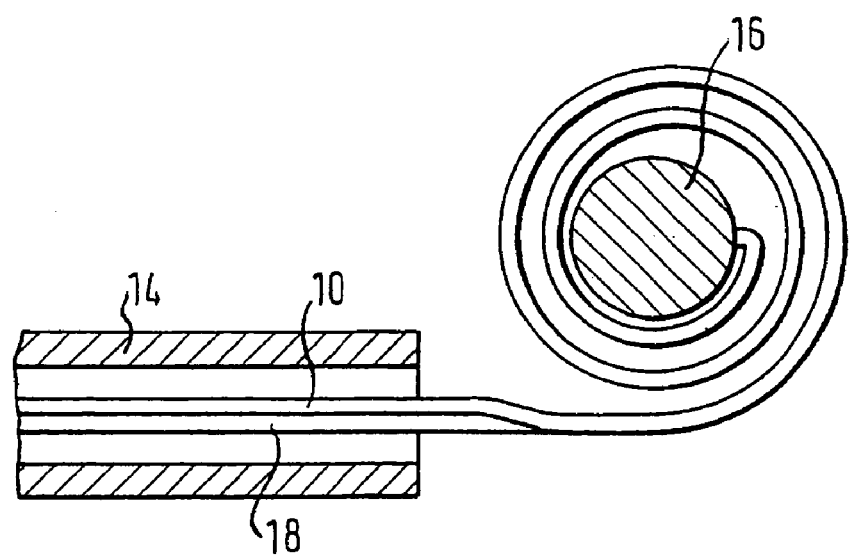
FIG. 4 shows on an enlarged scale the detail IV of FIG. 2.

To wind the window blind 10 on the winding shaft 16, the guide element 18 is transferred from the first cross-sectional shape shown in FIG. 3 to a second cross-sectional shape shown in FIG. 4. After the guide element 18 leaves the guide 14 and as the window blind 10 is wound up on the winding shaft 16, the guide element 18 is pressed into a flat shape to form a rectangular cross-section whose thickness corresponds to the thickness of the flexible material in the window blind 10. In this state, the window blind 10 can be wound-up together with the guide element 18 in a space-saving manner.

In addition to its curvature in the transverse direction, the guide element 18 can also be curved in the longitudinal direction so that it rolls up automatically. In this configuration, the usually customary roll-up spring on the winding shaft 16 may be eliminated. At the same time, the guide element 18 provides a constant tensile force and also increases the shifting force to obtain a self-locking effect in the window blind 10. Thus, the window blind 10 will remain in any intermediate position when actuated by hand without the need of an additional window blind brake.

Figure 5:
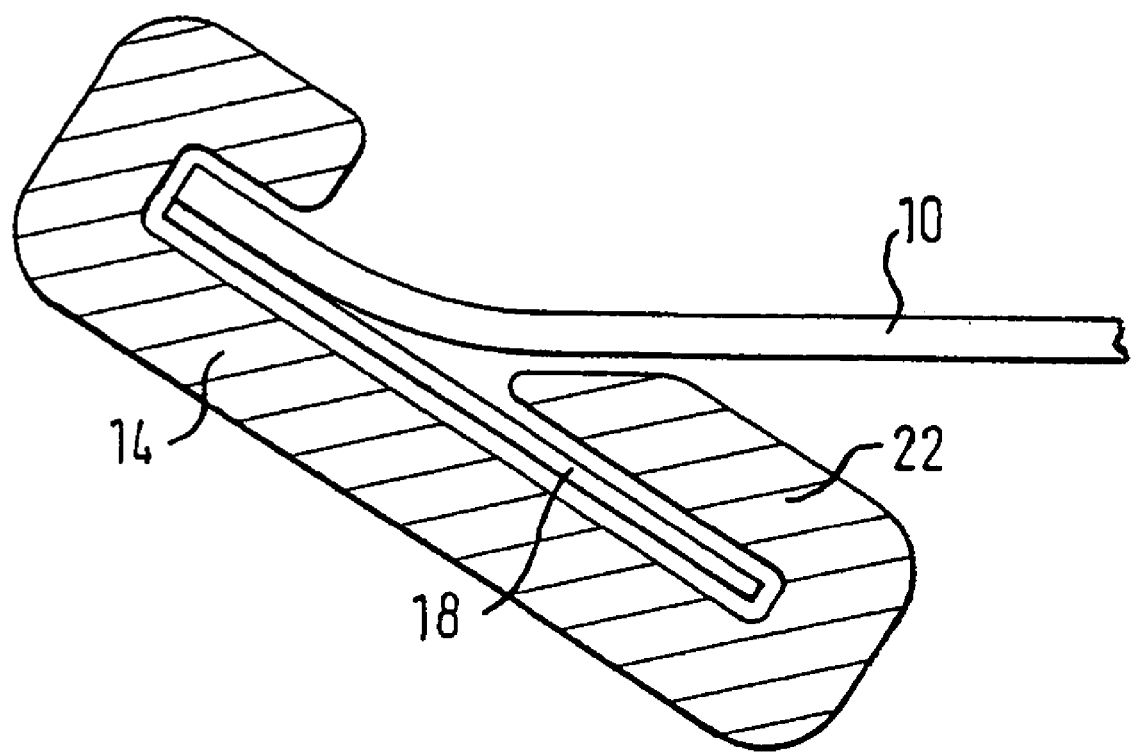
FIG. 5 shows an alternative embodiment of the invention in a view corresponding to the view of FIG. 3.

FIG. 5 shows an alternative embodiment. The same reference symbols will be used for those components that are already known from the first embodiment, and in this respect reference is made to the above explanations.

The difference in this embodiment with respect to the embodiment illustrated in FIGS. 3 and 4 is that the guide element 18 shown in FIG. 5 has a flat and rectangular cross-section. To position the window blind 10 in the guide 14, the window blind 10 is connected with a portion (e.g., about one half) of the guide element 18 like in the embodiment according to FIGS. 3 and 4 so that the other half can be received behind the leg 22 of the guide element 18.

If the window blind 10 is being wound on the winding shaft 16, the edge portion of the window blind 10 is slightly turned so that the guide element 18 lies flat against the window blind 10. In this state, it will then be wound up on the winding shaft 16 together with the window blind 10.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A window blind for a sliding roof system, comprising:
a flexible material having two longitudinal edges; and
at least one guide element extending along at least one of the two longitudinal edges, wherein the at least one guide element is adapted to engage in a guide corresponding to the at least one of the two longitudinal edges, wherein the at least one guide element is a strip attached to the at least one of the two longitudinal edges of the flexible material so that the at least one guide element can be wound up together with the window blind, and wherein the strip has an inboard edge and an outboard edge, the flexible material being attached only from the outboard edge to a central portion of the strip such that the inboard edge is spaced from the flexible material.

2. The window blind according to claim 1, wherein the at least one guide element in an initial state has a first cross-sectional shape to hold the at least one guide element in the guide, and wherein the at least one guide element is transferable to a second cross-sectional shape that allows the window blind to wind up in a space-saving manner.

3. The window blind according to claim 2, wherein the first cross-sectional shape is curved.

4. The window blind according to claim 1, wherein the at least one guide element has a substantially rectangular cross-section.

5. The window blind according to claim 1, wherein the at least one guide element is a metal strip.

6. The window blind according to claim 5, wherein the at least one guide element is made of resilient steel.

7. The window blind according to claim 1, wherein the at least one guide element is a plastic strip.

8. A vehicle roof blind assembly, comprising:
a window blind including a flexible material having two longitudinal edges;
two guide elements, with one guide element extending along each of the two longitudinal edges, wherein each of the two guide elements is a strip attached to a corresponding longitudinal edge of the flexible material so that the two guide elements can be wound up together with the window blind, and wherein each strip has an inboard edge and an outboard edge, the flexible material being attached only from the outboard edge to a central portion of each strip such that the inboard edge is spaced from the flexible material; and
two guide rails, each of the two guide elements engaging in a corresponding guide rail such that each of the two longitudinal edges is movably arranged with an associated guide element in one of the two guide rails.

9. The vehicle roof blind assembly according to claim 8, wherein a cross-section of each of the two guide rails has a leg that extends between the flexible material and a corresponding one of the two guide elements.

10. The vehicle roof blind assembly according to claim 8, wherein at least one of the two guide elements in an initial state has a first cross-sectional shape to hold the at least one of the two guide elements in the corresponding guide rail, and wherein the at least one of the two guide elements is transferable to a second cross-sectional shape that allows the window blind to wind up in a space-saving manner.

11. The vehicle roof blind assembly according to claim 10, wherein the first cross-sectional shape is curved.

12. The vehicle roof blind assembly according to claim 8, wherein at least one of the two guide elements has a rectangular cross-section.

13. The window blind according to claim 1 wherein the strip has a curved cross-section defining a vertex between the inboard and outboard edges, the vertex comprising the central portion of the strip, and wherein an attachment interface between the strip and the flexible material extends from the outboard edge to the vertex such that there is direct contact between the strip and the flexible material entirely from the outboard edge to the vertex.

14. The window blind according to claim 1 wherein the strip is comprised of a resilient material and wherein the flexible material is solely attached to the strip from the outboard edge to the central portion along the at least one of the two longitudinal edges of the window blind, wherein the inboard edge faces toward a vehicle center and the outboard edge is laterally spaced from the inboard edge in a direction away from the vehicle center.

15. The window blind according to claim 1 wherein the guide comprises a guide rail mountable to a vehicle roof, the guide rail including a leg that extends into a space formed between the flexible material and the inboard edge of the strip, the strip cooperating with the leg to hold the window blind taut in a transverse direction.

16. The vehicle roof blind assembly according to claim 8 wherein each strip has a curved cross-section defining a vertex between the inboard and outboard edges, the vertex comprising the central portion of each strip, and wherein an attachment interface between each strip and the flexible material extends from a respective one of the outboard edges to the vertex.

17. The vehicle roof blind assembly according to claim 8 wherein each strip is comprised of a resilient material and wherein each of the two guide rails has an inboard rail portion and an outboard rail portion that define an interior cavity that receives one strip, each of the two guide rails including a leg that extends from the inboard rail portion toward the outboard rail portion, the leg extending into a space formed between the flexible material and the inboard edge of the strip such that the strip and corresponding leg cooperate to hold the window blind taut in a transverse direction.

18. A vehicle roof blind assembly for a sliding roof system, comprising:
a blind selectively moveable to cover a roof opening, the blind being formed from a flexible material having two longitudinal edges;
at least one resilient strip extending along at least one of the two longitudinal edges and having an innermost strip edge and an outermost strip edge, the at least one resilient strip being attached to one of the two longitudinal edges of the flexible material only from the outermost strip edge to a central portion of the at least one resilient strip; and
at least one guide rail mountable to a vehicle roof adjacent the roof opening, the at least one guide rail guiding movement of the blind between an open position and a closed position relative to the roof opening.

19. The vehicle roof blind assembly according to claim 18 wherein the innermost strip edge faces a vehicle center and wherein the outermost strip edge is laterally spaced away from the innermost strip edge in a direction away from the vehicle center, the flexible material being attached only from the outermost strip edge to the central portion such that the innermost strip edge is spaced apart from the flexible material.

20. The vehicle roof blind assembly according to claim 19 wherein the at least one resilient strip has a curved cross-section defining a vertex between the innermost and outermost strip edges, the vertex comprising the central portion of the at least one resilient strip, and wherein an attachment interface between the at least one resilient strip and the flexible material extends from the outermost strip edge to the vertex such that there is continuous direct contact between the at least one resilient strip and the flexible material in a lateral direction extending from the outermost strip edge to the vertex.

* * * * *